United States Patent [19]

Sundeen

[11] 4,222,002
[45] Sep. 9, 1980

[54] POTENTIAL GENERATING SYSTEM INCLUDING AN AUXILIARY DIRECT CURRENT POTENTIAL PRODUCING ARRANGEMENT

[75] Inventor: Arthur R. Sundeen, Lansing, Mich.

[73] Assignee: General Motors Corporation, Detroit, Mich.

[21] Appl. No.: 951,498

[22] Filed: Oct. 16, 1978

[51] Int. Cl.² ............................................. H02P 9/14
[52] U.S. Cl. ........................................ 322/86; 322/60
[58] Field of Search ........................ 322/60, 86, 87, 88, 322/70, 28; 320/15

[56] References Cited

U.S. PATENT DOCUMENTS

| | | |
|---|---|---|
| 2,668,271 | 2/1954 | Harmon . |
| 2,844,783 | 7/1958 | Chandler et al. ................. 322/88 X |
| 3,611,112 | 10/1971 | Lehinhoff .......................... 322/60 X |
| 3,671,843 | 6/1972 | Huntzinger et al. .................. 320/15 |
| 4,032,835 | 6/1977 | Finnell et al. ........................... 322/86 |
| 4,143,280 | 3/1979 | Kuehn et al. ....................... 322/88 X |

Primary Examiner—Robert J. Hickey
Attorney, Agent, or Firm—Richard G. Stahr

[57] ABSTRACT

In a direct current potential generating system of the type in which the system potential generating device field winding is energized by the generating system output potential connected in a field winding energizing circuit, an auxiliary direct current potential of a selected level is produced when the potential applied across the field winding decreases in magnitude to a preselected reduced level and is connected in the field winding energizing circuit in series aiding relationship with the generating system output potential.

5 Claims, 7 Drawing Figures

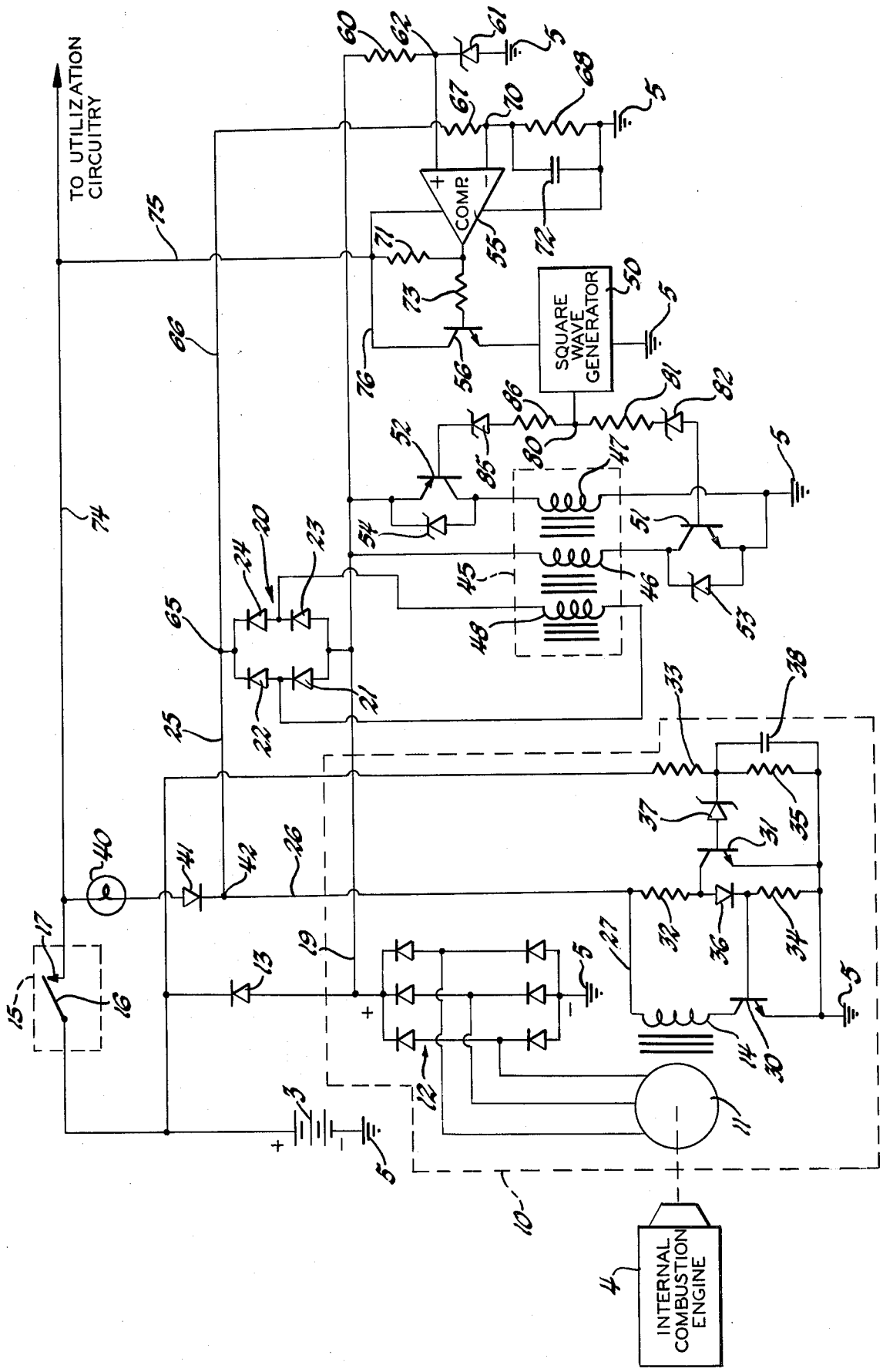

POTENTIAL GENERATING SYSTEM INCLUDING AN AUXILIARY DIRECT CURRENT POTENTIAL PRODUCING ARRANGEMENT

This invention is directed to potential generating systems, and more specifically, to a potential generating system that includes an arrangement for producing an auxiliary direct current potential that is connected in the system potential generating device field winding energization circuit in series aiding relationship with the system output potential when the potential applied across the field winding decreases in magnitude to a preselected reduced level.

In most modern automobiles, the potential generating system employs an electrical alternator as the system potential generating device and the alternator field winding energizing potential is supplied by the generating system output potential. The resultant field current is controlled by a voltage regulator to maintain constant system output potential under varying load and alternator speed conditions. At any alternator speed, there is a maximum load at which full field current may be maintained. Any increase in load beyond this maximum results in decreased system output potential as a result of the potential drop across the internal alternator armature impedance. This decreased system output potential results in proportionally decreased field current which further results in a decreased system output potential. This avalanche effect of decreasing system output potential would continue until the system output potential reached zero except for the fact that, in practical automotive applications, the automobile battery supplies the additional load current, a condition that results in a stable operating point at a system output potential and current that are less than the maximum output values. Although the voltage regulator remains in a full field current command condition, the field winding energizing current is lower than maximum because the system output potential is also lower. Therefore, a potential generating system that includes an arrangement for providing an auxiliary direct current potential to aid in alternator field winding energization when the potential applied across the field winding decreases in magnitude to a preselected reduced level as a result of overload conditions, is desirable.

It is, therefore, an object of this invention to provide an improved potential generating system.

It is an additional object of this invention to provide an improved potential generating system that includes an arrangement for producing an auxiliary direct current potential that is employed to aid in system potential generating device field winding energization when the potential applied across the field winding decreases in magnitude to a preselected reduced level.

In accordance with this invention, a potential generating system of the type in which the system potential generating device field winding is energized by the generating system output potential connected in a field winding energizing circuit is provided wherein an auxiliary direct current potential of a selected level is produced when the potential applied across the field winding decreases in magnitude to a preselected reduced level and is connected in the field winding energizing circuit in series aiding relationship with the generating system output potential.

For a better understanding of the present invention, together with additional objects, advantages and features thereof, reference is made to the following description and accompanying single FIGURE drawing which sets forth the improved potential generating system of this invention in schematic form.

As point of reference or ground potential is the same point electrically throughout the system, it is illustrated in FIG. 1 by the accepted schematic symbol and is referenced by the numeral 5.

The system of this invention operates to adjust the operating point of the alternating current alternator to produce more load current than the maximum value that may be produced when the system output potential decreases in magnitude to a lower level. This is accomplished by supplying the alternator field winding with a constant energizing potential source equal to maximum regulated armature potential but which does not decrease with system output potential when electrical loads are applied in excess of maximum voltage regulator command field energizing current. The result is a system output current which is greater by about 25% in practical applications depending upon speed and load conditions. The constant energizing potential source consists of a DC to DC converter which employs available system output potential as an input and converts this potential into a proportional auxiliary output potential that is added in series aiding relationship with the system output potential to supply alternator field winding energizing current. The resulting alternator field winding energizing supply potential is the sum of the system output potential plus the proportional auxiliary output potential of the converter circuit. The constant of proportionality is designed to result in rated maximum alternator field excitation potential with system output potentials approximately 25% less than maximum. Under conditions of less than maximum load which would normally then produce full regulated system output potential and, thus, higher than normal alternator field winding energization supply potential, an activating circuit senses the potential applied across the alternator field winding and activates the DC to DC converter only when the potential applied across the field winding has decreased in magnitude to a preselected reduced level.

Referring to the FIGURE, the improved direct current potential generating system of this invention is set forth in schematic form in combination with a conventional automobile type storage battery 3 and a conventional internal combustion engine 4. The circuitry contained within the dashed line enclosure 10 represents a typical automotive type direct current potential generating system wherein the field winding of the system potential generating device is energized by the generating system output potential connected in a field winding energizing circuit. Internal combustion engine 4 is arranged to drive a conventional automotive type alternator 11 in a manner well known in the art. The three phase output potential of alternator 11 is full wave rectified into a direct current system output potential by a conventional six diode bridge three phase full wave rectifier circuit 12 of a type well known in the art having a positive polarity output terminal connected to the positive polarity output terminal of battery 3 through a blocking diode 13 and a negative polarity output terminal connected to point of reference or ground potential 5.

The positive polarity output terminal of battery 3 is connected to the movable contact 16 of a conventional automotive type ignition switch 15 having in addition to movable contact 16 a stationary contact 17. Movable contact 16 and stationary contact 17 may be the normally open ignition circuit contacts of a conventional automotive type ignition switch well known in the art or any other suitable single pole-single throw electrical switch.

The energizing circuit for field winding 14 of alternator 11 may be traced from the positive polarity output terminal of rectifier circuit 12, through lead 19, through the parallel combination of series connected diode pairs 21–22 and 23–24 of full wave recifier circuit 20, leads 25, 26 and 27, field winding 14, the collector-emitter electrodes of NPN switching transistor 30 while this device is in the conductive mode and point of reference or ground potential 5 to the negative polarity output terminal of rectifier circuit 12. The circuitry including NPN switching transistor 30, NPN control transistor 31, resistors 32, 33, 34 and 35, diode 36, Zener diode 37 and filter capacitor 38 comprises a conventional voltage regulator circuit of a type well known in the automotive art. Briefly, while the system output potential of rectifier circuit 12 is less than a predetermined magnitude, Zener diode 37 remains in the blocking state to maintain control transistor 31 not conductive through the current carrying electrodes thereof. While control transistor 31 is not conductive, the potential across resistor 34 is of a magnitude sufficient to trigger NPN switching transistor 30 conductive through the collector-emitter electrodes to complete the previously described energizing circuit for field winding 14 of alternator 11. Should the system output potential of rectifier circuit 12 increase to a level substantially equal to or greater than the predetermined magnitude, Zener diode 37 breaks down and conducts in a reverse direction to trigger NPN control transistor 31 conductive through the current carrying electrodes thereof. While control transistor 31 is conductive, base-emitter drive current is diverted from switching transistor 30 to extinguish this device which interrupts the alternator 11 field winding 14 energizing circuit.

Electric lamp 40 is the charge indicator lamp well known in the automotive art which illuminates while movable contact 16 of switch 15 is closed to stationary contact 17 and alternator 11 is not charging battery 3. Upon the closure of movable contact 16 of switch 15 to stationary contact 17 while alternator 11 is not charging battery 3, such as when engine 4 is not in the "Run" mode, an energizing circuit for charge indicator lamp 40 is provided and may be traced from the positive polarity output terminal battery 3 through the closed contacts of switch 15, charge indicator lamp 40, diode 41, junction 42, leads 26 and 27, alternator field winding 14, the collector-emitter electrodes of NPN switching transistor 30 that is rendered conductive upon the closure of switch 15 contacts 16 and 17 and point of reference or ground potential 5 to the negative polarity output terminal of battery 3. Consequently, charge indicator lamp 40 becomes illuminated to indicate that alternator 11 is not charging battery 3. When engine 4 is cranked and begins to operate in the "Run" mode, the output potential of alternator 11 and of rectifier circuit 12 builds up, consequently the potential upon junction 42 increases to a magnitude substantially equal to that upon the positive output terminal of full wave rectifier circuit 12. This potential, applied to the cathode electrode of diode 41 reverse biases this device, consequently, charge indicator lamp 40 extinguishes to indicate that alternator 11 is charging battery 3. If desired, charge indicator lamp 40 may be fused.

To produce an auxiliary direct current potential of a selected level and for connecting the auxiliary potential in the system potential generating device field winding energizing circuit in series aiding relationship with the generating system output potential, a transformer 45 having two primary windings 46 and 47 magnetically coupled to a secondary winding 48, a square wave pulse generator 50, an NPN switching transistor 51, a PNP switching transistor 52 and full wave rectifier circuit 20 are employed. Zener diodes 53 and 54 may be connected across the collector and emitter electrodes of respective transistors 51 and 52 to provide overvoltage protection for these devices. As square wave pulse generator 50 may be any of the several square wave pulse generator circuits well known in the art of the type that produces a series of square wave output signal pulses and, per se, forms no part of this invention, it is illustrated in FIG. 1 in block form. One example of a square wave pulse generator of this type is shown on page 5–47 of a National Semiconductor Corporation publication copyrighted in 1976 and entitled "Linear Data Book". In an actual embodiment of the system of this invention, square wave pulse generator 50 was designed to produce a series of square wave output signal pulses at a repetition rate of the order of 400 pulses per second.

To activate the circuit for producing the auxiliary direct current potential when the potential applied across alternator field winding 14 decreases in magnitude to a preselected reduced level, a voltage comparator circuit 55 and its associated circuitry to be later explained in detail and NPN switching transistor 56 may be employed. As comparator circuit 55 may be any of the many voltage comparator circuits well known in the art, and, per se, forms no part of this invention, it is illustrated in FIG. 1 in block form. One example of a voltage comparator circuit suitable for use with this application is marketed by the National Semiconductor Corporation under the designation LM2901. The system output potential is applied from the positive polarity output terminal of rectifier circuit 12 through lead 19 across the series combination of resistor 60 and reference Zener diode 61. Reference Zener diode 61 should have an inverse breakdown potential of a value less than that of the rated system output potential. In the actual embodiment of the system of this invention, the Zener diode selected as reference Zener diode 61 has a direct current inverse breakdown potential rating of 6 volts. Therefore, while the system output potential is of a magnitude higher than the inverse breakdown potential of reference Zener diode 61, a reference potential signal appears across junction 62 and point of reference or ground potential 5 and is of a positive polarity upon junction 62 with respect to point of reference or ground potential 5. This reference potential signal upon junction 62 is applied as an input reference signal to the non-inverting input terminal of voltage comparator circuit 55. The potential that is applied across alternator field winding 14 through the field winding energizing circuit previously described is taken from junction 65 and applied through lead 66 across series resistors 67 and 68. The ohmic value of series resistors 67 and 68 are so proportioned relative to each other that, with a direct current energizing potential of the order of 14 volts applied across alternator field winding 14, the potential signal upon junction 70 between series resistors 67 and 68 is of a value substantially equal to that of the rated inverse breakdown potential of reference Zener diode 61. This potential signal is of a positive polarity upon junction 70 with respect to point of reference or ground potential 5 and is applied as an input signal to the inverting input terminal of comparator circuit 55. As the output device of voltage comparator circuit 55 is the uncommitted collector electrode of an NPN transistor, resistor 71 is the usual pull-up resistor employed with comparator circuits of this type. Capacitor 72 is a filter capacitor connected in parallel with resistor 68. The output terminal of voltage comparator circuit 55 is connected through base resistor 73 to the base electrode of NPN switching transistor 56, the collector-emitter electrodes of which are connected in series in a supply circuit for square wave pulse generator 50. This circuit may be traced from the positive polarity output terminal of battery 3, through switch 15 when movable contact 16 thereof is closed to stationary contact 17, leads 74, 75 and 76, the collector-emitter electrodes of NPN switching transistor 56, square wave pulse generator 50 and point of reference or ground potential 5 to the negative polarity output terminal of battery 3.

When the potential applied across alternator field winding 14 is of the rated magnitude, of the order of 15 volts for example, the potential signal appearing upon junction 70 and applied to the inverting input terminal of comparator circuit 55 is of a greater potential level than that of the reference potential signal appearing upon junction 62 and applied as a reference signal to the non-inverting input terminal of comparator circuit 55. Therefore, the output signal of comparator circuit 55 is substantially ground potential and, as a consequence, NPN switching transistor 56 is not conductive. With NPN switching transistor 56 not conducting, supply potential is removed from square wave pulse generator 50 and, as a consequence, this device is not operative, a condition that disables the circuitry hereabove described for producing the auxiliary potential.

Should the potential applied across alternator field winding 14 decrease in magnitude to a reduced level at which the potential signal present upon junction 70 is of a potential level less than that of the reference potential signal upon junction 62, voltage comparator circuit 55 switches to the state in which a positive polarity output signal is present upon the output terminal thereof. This positive polarity output signal is of a sufficient level to produce base-emitter drive current through NPN switching transistor 56 to trigger this device conductive through the collector-emitter electrodes thereof. Upon the conduction of NPN switching transistor 56, supply potential is applied through the circuit previously described to square wave pulse generator 50 to activate this device. When activated, square wave pulse generator 50 produces a series of output signal pulses at a predetermined repetition rate or frequency, in the actual embodiment of the order of 400 pulses per second, that are applied to junction 80. During the period of the positive polarity excursion of each of the output signal pulses of square wave pulse generator 50, a positive polarity potential signal is present upon junction 80. During these periods, therefore, base-emitter drive current is supplied to NPN switching transistor 51 through a circuit that may be traced from square wave pulse generator 50, through junction 80, resistor 81, Zener diode 82, the base-emitter electrode of NPN switching transistor 51 and point of reference or ground potential 5 to square wave pulse generator 50. This base-emitter drive current renders NPN switching transistor 51 conductive through the collector-emitter electrodes thereof. Conducting switching transistor 51 completes an energizing circuit for primary winding 46 of transformer 45 that may be traced from the positive polarity output terminal of rectifier circuit 12, through lead 19, primary winding 46, the collector-emitter electrodes of conducting switching transistor 51 and point of reference or ground potential 5 to the negative polarity output terminal of rectifier circuit 12. During the period between each of the positive polarity excursions of the output signal pulses of square wave pulse generator 50, a substantially ground potential signal is present upon junction 80. During these periods, therefore, emitter-base drive current is supplied to PNP switching transistor 52 through a circuit that may be traced from the positive polarity output terminal of rectifier circuit 12, through lead 19, the emitter-base electrodes of PNP switching transistor 52, Zener diode 85, resistor 86, junction 80 and point of reference or ground potential 5 to the negative polarity output terminal of rectifier circuit 12. This emitter-base drive current renders PNP switching transistor 52 conductive through the emitter-collector electrodes thereof. Conducting switching transistor 52 completes an energizing circuit for primary winding 47 of transformer 45 that may be traced from the positive polarity output terminal of rectifier circuit 12, through lead 19, the emitter-collector electrodes of conducting switching transistor 52, primary winding 47 and point of reference or ground potential 5 to the negative polarity output terminal of rectifier circuit 12. While supply potential is applied to square wave pulse generator 50, primary windings 46 and 47 are alternately energized at the operating frequency of square wave pulse generator 50. Therefore, there is induced in secondary winding 48 a potential signal that is of a substantially square wave form and which has both positive and negative polarity excursions with respect to point of reference or ground potential 5 while switching transistor 51 is conductive and while switching transistor 52 is conductive, respectively, as primary windings 46 and 47 are so poled as to induce opposite polarity potentials in secondary winding 48. The potential signal induced in secondary winding 48 is full wave rectified by rectifier circuit 20 and applied in series aiding relationship with the generating system output potential in the previously described alternator field winding 14 energizing circuit. In the actual embodiment, the turns ratio between each of primary windings 46 and 47 and secondary winding 48 is 10 to 4. Therefore, the potential induced in secondary winding 48 is four tenths (4/10) of the potential applied across each of primary windings 46 and 47.

From this description, it is apparent that the circuitry including square wave pulse generator 50, transformer 45, switching transistors 51 and 52 and rectifier circuit 20 comprise a DC to DC converter circuit that produces an auxiliary direct current potential of a selective level when the potential applied to the field winding 14 reduces in magnitude to a preselected reduced level and that this auxiliary direct current potential is connected in the alternator field winding 14 energizing circuit in series aiding relationship with the generating system output potential through full wave rectifier circuit 20. Further, comparator circuit 55, switching transistor 56 and the associated circuitry are responsive to the potential applied across the alternator field winding 14 energizing circuit for activating the DC to DC converter circuit when the potential applied across alternator field winding 14 decreases in magnitude to a preselected reduced level and vice versa.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. In a direct current potential generating system of the type wherein the field winding of the system potential generating device is energized by the generating system output potential connected in a field winding energizing circuit, an auxiliary direct current potential producing system that is operative to maintain substantially full energizing current flow through the system potential generating device field winding when the system output potential decreases in magnitude to a reduced level as a result of overload conditions comprising:
   means for producing an auxiliary direct current potential of a selected level and for connecting said auxiliary potential in said system potential generating device field winding energizing circuit in series aiding relationship with said generating system output potential; and
   means responsive to the potential applied across said system potential generating device field winding for activating said means for producing said auxiliary direct current potential when the potential applied across said field winding decreases in magnitude to a preselected reduced level.

2. In a direct current potential generating system of the type wherein the field winding of the system potential generating device is energized by the generating system output potential connected in a field winding energizing circuit, an auxiliary direct current potential producing system that is operative to maintain substantially full energizing current flow through the system potential generating device field winding when the system output potential decreases in magnitude to a reduced level as a result of overload conditions comprising:
   a DC to DC converter circuit for producing an auxiliary direct current potential of a selected level and including means for connecting said auxiliary potential in said system potential generating device field winding energizing circuit in series aiding relationship with said generating system output potential;
   means responsive to the potential applied across said system potential generating device field winding for producing an output signal when the potential applied across said field winding decreases in magnitude to a preselected reduced level; and
   means responsive to said output signal for effecting the activation of said DC to DC converter circuit.

3. In a direct current potential generating system of the type wherein the field winding of the system potential generating device is energized by the generating system output potential connected in a field winding energizing circuit, an auxiliary direct current potential producing system that is operative to maintain substantially full energizing current flow through the system potential generating device field winding when the system output potential decreases in magnitude to a reduced level as a result of overload conditions comprising:
   a DC to DC converter circuit for producing an auxiliary direct current potential of a selected level and including means for connecting said auxiliary potential in said system potential generating device field winding energizing circuit in series aiding relationship with said generating system output potential;
   a voltage comparator circuit responsive to the potential applied across said system potential generating device field winding and a reference potential for producing an output signal when the potential applied across said field winding decreases in magnitude to a level less than that of said reference potential; and
   means responsive to said output signal for effecting the activation of said DC to DC converter circuit.

4. In a direct current potential generating system of the type wherein the field winding of the system potential generating device is energized by the generating system output potential connected in a field winding energizing circuit, an auxiliary direct current potential producing system that is operative to maintain substantially full energizing current flow through the system potential generating device field winding when the system output potential decreases in magnitude to a reduced level as a result of overload conditions comprising:
   a transformer having two primary windings magnetically coupled to a secondary winding;
   means for effecting the alternate completion and interruption of respective energizing circuits through which said primary windings may be alternately energized by said generating system output potential whereby a potential signal is induced in said secondary winding;
   means for full wave rectifying said potential signal induced in said secondary winding to a direct current potential and for applying said direct current potential in said system potential generating device field winding energizing circuit in series aiding relationship with said generating system output potential;
   a voltage comparator circuit responsive to the potential applied across said system potential generating device field winding and a reference potential for producing an output signal when the potential applied across said field winding decreases in magnitude to a level less than that of said reference potential; and
   means responsive to said output signal for effecting the activation of said means for effecting the alternate completion and interruption of respective energizing circuits through which said primary windings may be alternately energized.

5. In a direct current potential generating system of the type wherein the field winding of the system potential generating device is energized by the generating system output potential connected in a field winding energizing circuit, an auxiliary direct current potential producing system that is operative to maintain substantially full energizing current flow through the system potential generating device field winding when the system output potential decreases in magnitude to a reduced level as a result of overload conditions comprising:

a square wave pulse generator circuit for producing a series of square wave output signal pulses;

a transformer having two primary windings magnetically coupled to a secondary winding;

first switch means responsive to the period of each pulse of said series of square wave output signal pulses for completing an energizing circuit through which one of said primary windings may be energized by said generating system output potential;

second switch means responsive to the period between each pulse of said series of square wave output signal pulses for completing an energizing circuit through which the other one of said primary windings may be energized by said generating system output potential whereby a potential signal is induced in said secondary winding;

means for full wave rectifying said potential signal induced in said secondary winding to a direct current potential and for applying said direct current potential in said system potential generating device field winding energizing circuit in series aiding relationship with said generating system output potential;

a voltage comparator circuit responsive to the potential applied across said system potential generating device field winding and a reference potential for producing an output signal when the potential applied across said field winding decreases in magnitude to a level less than that of said reference potential; and means responsive to said output signal for effecting the activation of said square wave pulse generator circuit.

* * * * *